United States Patent [19]

Usry

[11] 4,070,604
[45] Jan. 24, 1978

[54] STEPPER MOTOR VALVE ACTUATOR

[75] Inventor: Joe D. Usry, Salt Lake City, Utah

[73] Assignee: E-Systems, Inc., Dallas, Tex.

[21] Appl. No.: 696,600

[22] Filed: June 16, 1976

[51] Int. Cl.² .............................................. H02P 1/42
[52] U.S. Cl. ........................... 318/203 A; 318/207 A; 318/212
[58] Field of Search ............... 318/168, 203 R, 203 A, 318/207 R, 207 A, 212

[56] References Cited

U.S. PATENT DOCUMENTS

| 3,286,148 | 11/1966 | Henderson | 318/203 R |
| 3,302,085 | 1/1967 | Hulls et al. | 318/207 R |
| 3,568,019 | 3/1971 | Hirokawa et al. | 318/203 A |
| 3,997,826 | 12/1976 | Mayer | 318/207 R |

Primary Examiner—Gene Z. Rubinson
Attorney, Agent, or Firm—Robert V. Wilder

[57] ABSTRACT

An actuator control system includes a ballscrew type actuator for controlling the positioning of a valve device. A control circuit is responsive to pulsed drive signals for driving a synchronous stepper motor which is operatively coupled to the actuator. The control circuit includes a switching device which applies a DC voltage to the motor windings to hold the valve position when it is not being driven.

9 Claims, 6 Drawing Figures

STEPPER MOTOR VALVE ACTUATOR

FIELD OF THE INVENTION

The present invention relates to motor operated valve control systems and more particularly to stepping motor control systems.

CROSS REFERENCE TO RELATED APPLICATIONS

Subject matter disclosed but not claimed herein is disclosed and claimed in a copending application Ser. No. 696,602, filed on even date herewith.

BACKGROUND OF THE INVENTION

In most process control systems, valve positioning is accomplished through the use of pneumatic actuators. The pneumatic actuators require compressed, clean, dry air for operation. The air transport requires long runs of metal tubing, filters, and continuously operating compressors. Further, the pneumatic system requires two types of motivational forces, electricity to run the compressor and compressed air.

Some fully electrical valve positioning devices have ben provided but are still subject to several disadvantages. Heretofore, synchronous motors, although desirable, have not been applicable to most systems since they require long bursts of AC voltage for their operation. One of the contributing factors which made it necessary to have long AC bursts to operate the synchronous motor was the inherent friction of the actuator device itself. Such bursts were required to overcome that friction and initiate movement of the actuator which is operatively coupled to the valve device. Because of the nature of the long bursts, it has heretofore been impossible to ascertain the precise moment and duration of the motor shaft movement. Thus, position feedback arrangements have been required to monitor valve position. Such feedback systems are complicated and add an unnecessary dimension to the control system and an additional source of error. A means is required to lock the motor rotor when it is not being driven so that when a power failure occurs a preloaded spring can drive the valve open or closed.

Some prior art devices have included stepper motors with a DC power signal being selectively applied to the field windings of the motor. Such systems however require large and expensive DC power supplies for generating the DC power.

Further, most prior art systems have been at least partially analog in their configuration and the simplicity and precision of a digital valve control system has not heretofore been provided.

Some prior art valve drive systems have included a reversible motor but have been subject to inaccuracies when the motor direction is reversed. Many systems in which reversible operation is required include a motor which is electrically driven in only one direction and returned by means of a mechanical spring device. The mechanical return device introduces a new source of error and inprecision vis a vis an all electric, digital system.

SUMMARY OF THE INVENTION

It is therefore an object of the present invention to provide a synchronous stepper motor valve actuator which obviates the disadvantages of prior art devices.

It is another object of the present invention to provide an actuator system which is entirely electrically driven and does not require pneumatic support.

It is still another object of the present invention to provide an actuator system as set forth which is substantially digitally controlled and operated.

It is a further object of the present invention to provide an actuator system as set forth and including a stepper operated synchronous motor.

It is still another object of the present invention to provide an actuator system as set forth which is compatible with a reversible motor for driving the actuator in either direction.

It is yet another object of the present invention to provide an actuator system as set forth which requires no valve position feedback arrangement.

It is a further object of the present invention to provide an actuator system as set forth which does not require a separate DC power supply.

It is yet another object of the present invention to provide an actuator system as set forth which includes means for locking the actuator in place when the motor is not being driven and which allows fail-open or close operations to occur upon a loss of primary power.

In accomplishing these and other objects, there has been provided, in accordance with the present invention, a substantially digital, stepper operated synchronous motor valve actuator system which is responsive to digital control signals for reversibly controlling the positioning of a regulated element. The control circuit responds to direction and drive signals for operating the actuator in discrete steps thereby inherently maintaining position information. The control circuit includes a switching means which is operable to convert the AC motor power signal to a DC level which is applied to the motor field windings to provide holding torque in the absence of a motor drive condition.

BRIEF DESCRIPTION OF THE DRAWINGS

A better understanding of the present invention may be had from the following description when read in connection with the accompanying drawings in which.

DETAILED DESCRIPTION OF THE PREFERRED EMBODIMENTS

Figure 1:
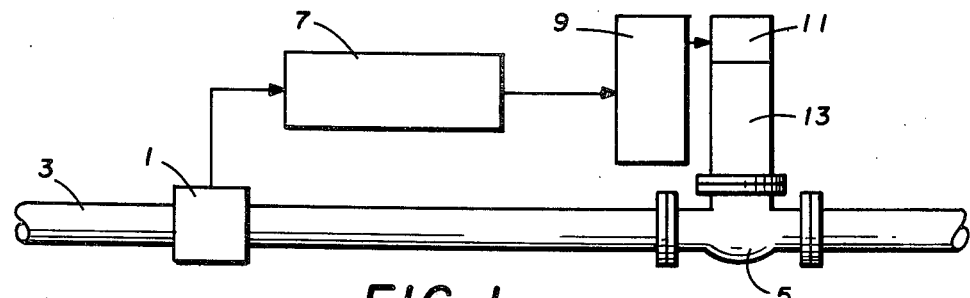
FIG. 1 is a schematic representation of an exemplary flow control system in which the present invention may be utilized.

In FIG. 1, a flow meter 1 monitors the flow within a conduit 3. The conduit 3 passes through a valve member 5. In the exemplary system of FIG. 1, the controlled variable is the flow of the fluid within the conduit 3 and the signal representative of the sensed flow at the flow meter 1 is applied to a process computer-controller 7. The process computer-controller 7 compares the detected flow signal with a set point or dialed-in flow magnitude and provides a series of signals to a control circuit 9. The control circuit 9 in turn applies several control signals to a motor 11 which operates an actuator 13. The actuator 13 is operatively coupled to the valve 5 to control the movement of a flow control element of the valve 5.

Figure 2:
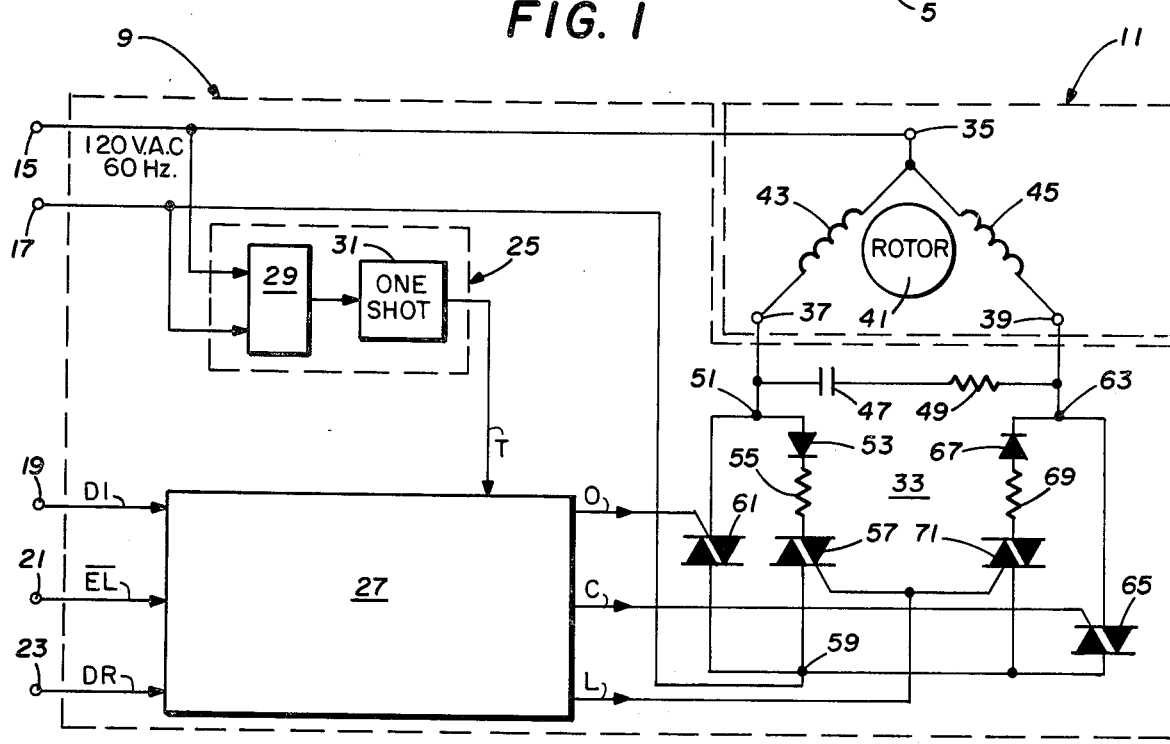
FIG. 2 is a schematic diagram of a portion of the circuitry shown in FIG. 1.

FIG. 2 shows a schematic diagram of the control circuit 9 and its connections to the terminals of the motor 11. The control circuit 9 in the exemplary embodiment receives a 60 Hz AC power at terminals 15 and 17 of the control circuit 9. The controller also provides a Direction signal D1, an External Lock signal $\overline{EL}$ and a Drive signal DR at terminals 19, 21 and 23 of the control circuit 9. The Direction signal D1 is provided to indicate in which of two directions the regulated element is to be moved. For example, if there is a logic 1 on the line designated D1, the controlled element within the valve 5 is to move in the direction D1 or, for example, in a downward direction. Similarly, if there is a logic 0 level on the line D1, the regulated element within the valve 5 is to move, for example, in an upward or open direction. D1 may represent either upward or downward movement in an application of the present invention but for purposes of illustration, a logic "1" on D1 represents an downward movement in the exemplary embodiment. The rotor is locked at all times when a drive command is not applied. The External Lock overides all direction and drive commands. The External Lock signal EL commands that the rotor should be locked in place notwithstanding any other signal. The Drive signal DR represents a command from the computer-controller 7 to effect a rotation of the rotor in accordance with the Direction signal D1. In the present example, a logic 1 level is indicative of a true statement as represented by approximately a +12 volt DC signal while a logic 0 or false level is represented by a 0 voltage level. Thus, if it is desired to move the regulated element upwardly, D1 will be at a logic 0 level, DR will be at a logic 1 level, and $\overline{EL}$ will be at a logic 1 level (indicating that the statement that there is not an external lock condition is true).

A zero voltage crossing switch or timing signal generating means 25 receives the 60 Hz power signal and provides the Timing signal T to a logic circuit 27. The logic circuit 27 also receives the Direction signal D1, External Lock signal $\overline{EL}$ and Drive signal DR. The zero crossing switch 25 includes a bi-stable switching element 29 and a one-shot multivibrator 31. Timing signal T in the present example, is a positive going pulse generated each time the power signal crosses the 0 voltage level, i.e. 120 times per second. The logic circuit 27 provides first, second and and third operational signals, viz. an Open signal O, a Close signal C and a Lock signal L for application to a switching device generally indicated at 33. The motor 11 has three terminals 35, 37 and 39 for connection to external circuits. The terminal 35 in the present example is directly connected to the power line applied to the input terminal 15 of the control circuit 9. The motor comprises a rotor 41 and first and second field windings 43 and 45, respectively. The winding 43 is connected between terminals 35 and 37 and the winding 45 is connected between terminals 35 and 39. The terminals 37 and 39 are connected through a phase-shifting network, comprising capacitor 47 and resistor 49, to the switching device 33. The switching device 33 is arranged to selectively couple the terminals 37 and 39 to the other side of the power line connected to terminal 17 in response to the control signals O, C, and L.

More specifically, the motor terminal 37 is connected to a first common point 51. The first common point 51 is connected to the anode terminal of a diode 53 the cathode terminal of which is connected through a resistor 55 to one switching terminal of a triac 57. The other switching terminal of the triac 57 is connected to a second common point 59 which is in turn connected to the second power lead from the input terminal 17 of the control circuit 9. Another triac 61 is also connected in parallel between the common terminal 51 and the common terminal 59. The triac 61 has a gate terminal connected to the logic circuit 27 for receiving the Open control signal O. The motor terminal 39 is connected to a third common terminal 63 of the switching device 33. Common terminal 63 is connected through a triac 65 to the second common terminal 59 and has its control terminal connected also to the logic circuit 27 for receiving the Close control signal C. The common terminal 63 is connected to the cathode terminal of a diode 67 and the terminal of which is connected through a resistor 69 to one switching terminal of a triac 71. The other switching terminal of the triac 71 is connected to the common point 59. The gate terminals of the triac 57 and 71 are arranged to received the Lock signal L.

The signals D1, $\overline{EL}$ and DR which are applied to the control circuit 9 from a process computer-controller 7 may be readily derived from many process computer-controllers on the market. Their only requirements are as follows: D1 remains at a logic 1 level so long as the regulated element is to move in a first direction and changes to a logic 0 level when the direction of travel is to be reversed; EL remains high when there is no external condition requiring that the rotor be locked in place and changes to a logic 0 level when such an external condition appears; and the DR signal is a train of pulses with each pulse representing a desired rotor step.

Figure 3:
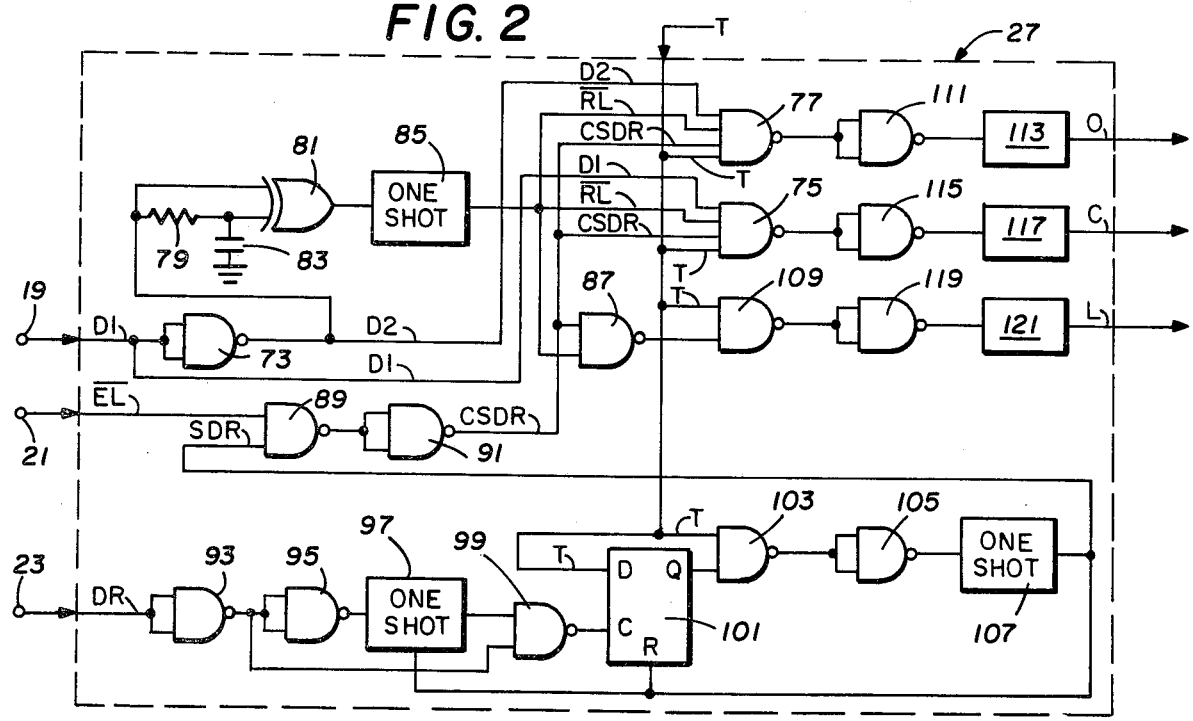
FIG. 3 is a detailed schematic diagram of a logic circuit shown in FIG. 2.

FIG. 3 shows the details of the logic circuit 27. The input terminal 19 is connected to both input terminals of a NAND gate 73. Input terminal 19 is also connected to one input terminal of a four-input NAND gate 75. The output terminal of the gate 73 is connected to one input terminal of another four-input NAND gate 77. The gate 73 output is also connected through a resistor 79 to one input terminal of an exclusive OR gate 81. That input terminal of the gate 81 is also connected through a capacitor 83 to a common reference potential. The output terminal of the gate 73 is also connected directly to a second input terminal of the gate 81. The output terminal of the gate 81 is connected to a one-shot multivibrator 85 which provides a Reverse Lock output signal $\overline{RL}$. As hereinafter explained in connection with the operation of the present invention, the signal $\overline{RL}$ is generated, i.e. assumes a logic 0 level whenever the Direction command D1 changes states. The $\overline{RL}$ signal is applied to one input terminal of gates 75 and 77. The $\overline{RL}$ signal is also applied to one input of a two-input NAND gate 87.

The input terminal 21 of the logic circuit 27 is connected to one input terminal of a two-input NAND gate 89. The output of the gate 89 is applied to an inverting NAND gate 91 which provides a Conditioned Synchronized Drive signal CSDR which is applied to the other input of the gate 87 and also to one input of each of gates 75 and 77. The other input of the NAND gate 89 is provided by a synchronization circuit to which the input terminal 23 is connected. The input terminal 23 provides the Drive signal DR which is applied to both input terminals of a NAND gate 93. The output of the gate 93 is applied to both input terminals of another NAND gate 95 the output terminal of which is connected to a one-shot multivibrator 97. The one-shot multivibrator 97 provides an output which is connected to one input terminal of a NAND gate 99 the other input terminal of which is connected to the output terminal of the gate 93. The output terminal of the gate 99 is connected to a bi-stable switching device 101 which also receives the Timing signal T from the zero voltage switch 25 as shown in FIG. 2. The device 101 has two output terminals one of which is connected to one terminal of a two-input NAND gate 103. The other input terminal of the gate 103 receives the Timing signal T. The reset input of the device 101 is connected back to the reset of the multivibrator 97. The output of the gate 103 is applied to both input terminals of a NAND gate 105, the output of which is connected to another one-shot multivibrator 107. The output of the one-shot multivibrator 107 is connected back to the reset of the one-shot multivibrator 97 and also provides the Synchronized Drive signal SDR which is applied to the other input terminal of the gate 89.

The Timing signal T from the zero voltage switch 25 is applied to one input terminal of each of gates 75 and 77 and also to one input terminal of a NAND gate 109. The other input terminal of the gate 109 is connected to the output terminal of the gate 87. The output terminal of the four-input NAND gate 77 is connected to both input terminals of an inverting NAND gate 111, the output terminal of which is connected to the input of a current drive circuit 113. The current drive circuit 113 provides the logic output Open signal O which is applied to the gate terminal of the triac 61 as shown in FIG. 2. Similarly, the output terminal of the four-input NAND gate 75 is connected to both input terminals of an inverting NAND gate 115 and the output of the NAND gate 115 is connected to the input of another current drive circuit 117. The output of the current drive circuit 117 provides the Close signal C which is applied to the gate terminal of the triac 65 in the switching device of the control circuit 9. The output terminal of the gate 109 is connected to both input terminals of an inverting NAND gate 119. The output terminal of the gate 119 is connected to a current drive circuit 121 which, in turn, provides the Locking signal L. As shown in FIG. 2 the Locking signal L is applied to both gate or control terminals of triacs 57 and 71 shown in FIG. 2.

Figures 4, 5:
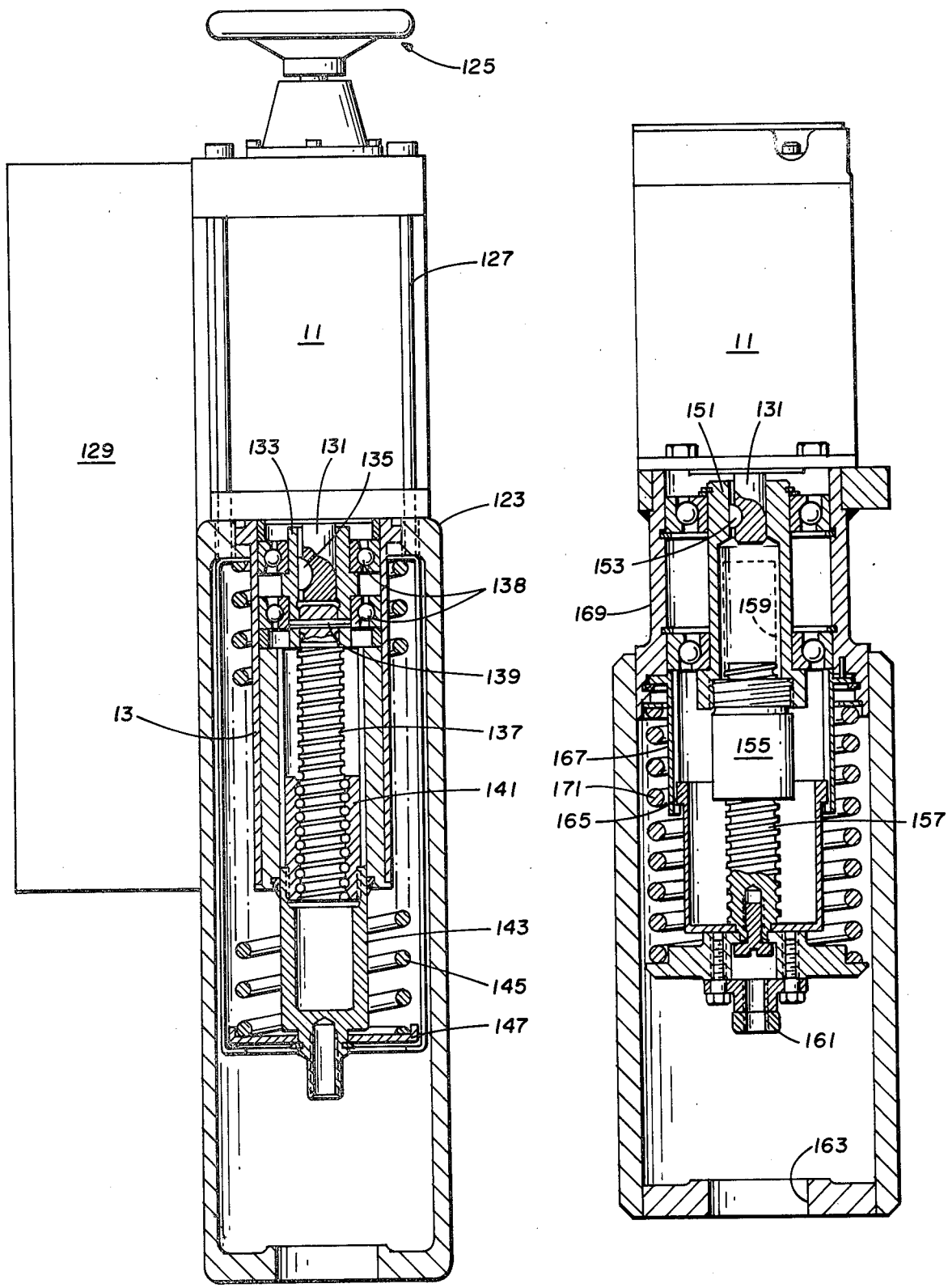
FIG. 4 is a cross-sectional view of an actuator device which may be used with the present invention.
FIG. 5 is a cross-sectional view of another embodiment of an actuator device used in connection with the present invention.

FIGS. 4 and 5 shown different arrangements for the actuator 13 which has the motor 11 mounted thereon. In FIG. 4, the motor 11 drives a threaded ballscrew, and a ballscrew nut, which is connected to the regulated element, is free to traverse the threaded ballscrew as the ballscrew rotates in response to the rotation of the motor shaft. In FIG. 5 the motor 11 is connected to a ballscrew nut and a threaded ballscrew, which is coupled to the regulated element of the valve, is free to traverse up and down within the ballscrew nut in accordance with the rotation of the nut thereby controlling the movement of the regulated element. In both FIGS. 4 and 5 like numerals designate like parts.

Specifically, in FIG. 4 the motor 11 is shown mounted on top of a yoke 123 which houses the actuator 13 as shown in FIG. 1. A handwheel 125 may be included to selectively engage the rear motor shaft for manual operation. The motor is held down with four bolts 127 through the motor flange into the yoke 123. The actuator assembly is inserted through a hole in the yoke and held in place by the motor. A cabinet 129 may be mounted alongside the actuator and motor to house the control circuit 9 as shown in FIG. 1. The shaft 131 of the motor 11 extends from the motor housing into the actuator assembly and is keyed to a coupler 133 with a keying device 135. The coupler 133 is connected to a ballscrew 137 by means of a locking pin 139 so that rotation of the motor shaft 131 effects the rotation of the ball screw 137. Angular contact load bearings are provided between the wall of the actuator 13 and the coupler 133. A ballscrew nut 141 engages the ballscrew 137 and is prevented from being rotated so that the rotation of the ballscrew 137 effects the linear movement of the ballscrew nut 141 up and down along the ballscrew. To prevent rotation of the ballscrew nut 141, the nut may be, for example, a Saginaw square ballscrew nut sliding up and down in a slot. The ballscrew nut is attached to an actuator stem 143 which is arranged to be connected to a regulated element of a valve through an opening at the bottom of the yoke 123. A spring 145 is mounted between an actuator stem base plate 147 and the upper shoulders of the yoke 123. The spring 145 is arranged to drive the actuator stem closed in the absence of a positive holding signal or driving signal applied to the motor 11. The spring 145 may also be arranged to fail-safe drive the actuator stem in the opposite direction.

In FIG. 5, another embodiment of the actuator assembly 13 is shown. The design of FIG. 5 and the design of FIG. 4 are operationally similar except that the role of the screw and nut in the translation of rotary to linear motion is reversed. The motor shaft 131 is keyed to a coupler 151 by means of a keying device 153. The coupler 151 is connected to a ballscrew nut 155 in such a manner that a rotation of the motor shaft 131 effects rotation of the ballscrew nut 155. A ball screw 157 is coupled to the ballscrew nut 155 and is free to traverse up and down within the area 159 as the ballscrew nut 155 is rotated. The ballscrew 157 is variously coupled to an actuator stem 161 which is arranged for connection to a regulated element of the valve 5 (not shown) through an opening 163 of the actuator assembly 13 of FIG. 5. A plurality of tabs 165 provide an anti-rotation device for restraining the ballscrew from rotation. The tabs 165 run in slots along an extension 167 of the actuator housing and yoke 169. As in FIG. 4, a spring 171 is provided to fail-safe close the actuator whenever the motor 11 does not provide holding torque or is not driven in one direction or the other.

The ballscrew and ballscrew nuts of the actuator shown in FIGS. 4 and 5 provide substantially reduced friction to enable more accurate control and longer life of the regulated element of the valve 5 through the stepping operation of the synchronous motor 11 as hereinafter noted.

Figure 6:
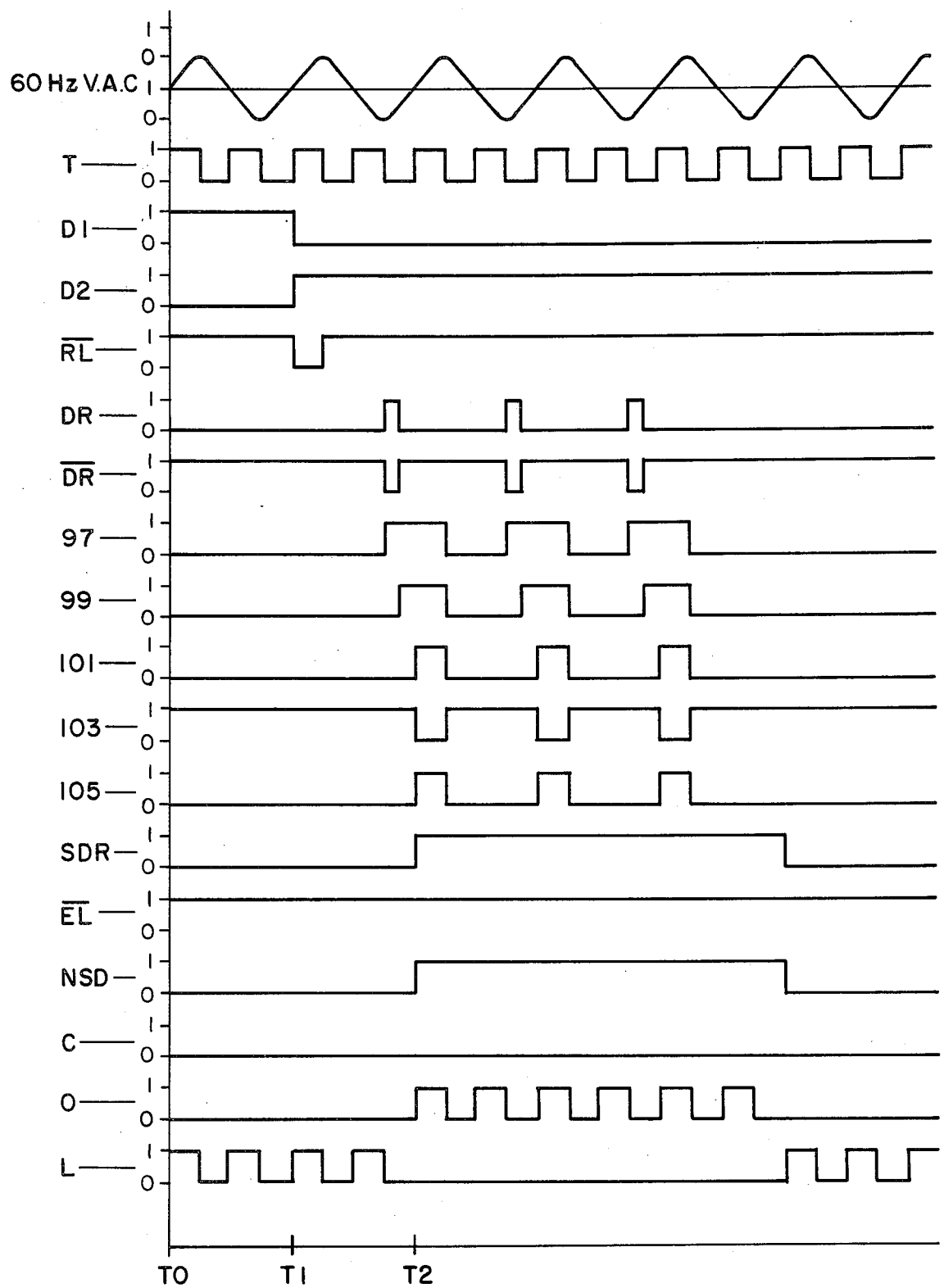
FIG. 6 is a timing chart useful in explaining several operational features of the present invention.

In operation, a 120 AC 60 Hz power signal is applied to terminals 15 and 17 of the control circuit 9. That voltage is applied to the zero voltage switch 25 which provides the Timing signal T. The one-shot multivibrator 31 actually delays its output signal by approximately 20° so that it is synchronized with the voltage applied to the field coils since there is a 20° inherent lag due to the inductive loading of the coils. However, for purposes of explanation, the 60 Hz power signal and the Timing signal T are shown in synchronism beginning at T0 on the abscissa of the timing chart shown in FIG. 6. Basically, a Direction signal D1 and a Drive signal DR are furnished by the computer-controller 7. In the present example, an external lock signal $\overline{EL}$ is also applied to the control circuit 9 although it is not considered an indispensable feature of the present invention. In FIG. 6 the Direction signal D1 is shown initially in the logic 1 or high state. In the present example, when the Direction signal D1 is at a logic 1 level, it will be assumed that the regulated element within the valve 5 is to be driven in the downward or closed direction. Conversely, when the direction signal D2, which is the inverse of D1, goes high, the regulated element within the valve 5 is to be driven in the upward or open direction.

When all of the inputs to the NAND gate 77 are at a logic 1 level, its output will go to a logic 0 level. Therefore, the output of gate 111 will go to a logic 1 level. That signal is applied to a current drive circuit 113 to provide a positive going Open signal O. Similarly, when all of the inputs to the gate 75 are at logic 1 level, the Close signal C will go to a logic 1 level to trigger the triac 65. It is noted that either the open gate 77 or the close gate 75 will be partially enabled at any one time since each receives as one of the inputs thereto inversely related direction signals. Thus, if the signal D2 is at a logic 1 level the open gate 77 may be enabled but the close gate 75 cannot be enabled since, necessarily, the Direction signal D1 will be at a logic 0 level thus precluding a low going output signal from the closed gate 75.

Upon a change of states of the Direction signal, a Reverse Lock signal $\overline{RL}$ is generated by the one-shot multivibrator 85. The purpose of the $\overline{RL}$ signal is to lock the rotor for a predetermined period thereby enabling a smoother and more accurate transistion in changing directions. As shown in FIG. 6, at a time T1 for example, the Direction signal D1 reverses and goes from a high logic level to a low logic level. That reversal precipitates the generation of a Reverse Lock signal $\overline{RL}$ in the form of a negative going pulse as shown in FIG. 6. In the present example, the duration of the Reverse Lock signal $\overline{RL}$ is approximately five milliseconds. Since the Reverse Lock signal $\overline{RL}$ is applied to both open and closed enable gates 77 and 75, neither an Open O or a Close C signal can be generated during the continuance of the $\overline{RL}$ signal, i.e. while the $\overline{RL}$ signal is at a 0 logic level.

The Drive signal DR is applied to terminal 23 of the control circuit 27 from the computer-controller 7. The drive signal in the present example has a frequency of 60 Hz and is a positive going signal which may vary in duration from 10 microseconds to 5 milliseconds. A filtering circuit (not shown) may be inserted between the input terminal 23 and the gate 93 to ground out noise signals have a duration of less than ten microseconds. In FIG. 6, three Drive signal pulses are generated beginning at time T2. The Drive pulses DR are inverted at gate 93 and again at gate 95 and applied to the one-shot multivibrator 97. The output of the multivibrator 97 is shown in FIG. 6 as the "97" signal. Whenever the drive signal DR goes high, the multivibrator 97 will provide a high going pulse of a duration of approximately 8 milliseconds. The output of the one-shot multivibrator 97 is applied with the inverse of the Drive signal DR to the gate 99. The output of the gate 99 is shown in FIG. 6, and the Drive signals DR are synchronized with the Timing signal T through the flip-flop circuit 101 and the NAND gate 103 and inverted at the NAND gate 105. That signal is applied to a one-shot multivibrator 107 which provides a Synchronized Drive signal SDR which is a positive going pulse having a duration of approximately 16 milliseconds in the present example.

As shown in FIG. 6, the Synchronized Drive signal SDR will remain high so long as sequential Drive signals are being received from the computer-controller 7.

The Synchronized Drive signal is applied to an NAND gate 89 along with the External Lock signal $\overline{EL}$. The External Lock signal $\overline{EL}$ will normally be at a logic 1 level as shown in FIG. 6 unless a condition external to the control circuit 27 requires that the regulated element in the valve 5 be stopped in which case the $\overline{EL}$ signal will drop to a logic 0 level. If no external conditions exist which woulld require the motor to be locked, $\overline{EL}$ will be at a high logic level. Therefore, while the Synchronized Drive signal SDR is at a logic 1 level the Conditioned Synchronized Drive signal CSDR will also be at a logic 1 level thereby selectively allowing either gate 75 or gate 77 to be enabled depending upon which direction signal is present. Since, in the present example, at time T2 the Direction signal D2 is at a logic 1 level, the CSDR signal may effect the opening of the regulated element in the valve 5 but not the closing thereof.

At the time the Conditioned Synchronized Drive signal CSDR is generated in the present example, the D2 signal as well as the $\overline{RL}$ signal are both at a logic 1 level and therefore the output of the open gate 77 will vary with the Timing signal T so long as all of the outer inputs to the Open gate 77 remain at a logic 1 or high logic level. Thus, the Open signal O will vary as shown in FIG. 6 applying a series of positive going pulses to the control terminal of the triac 61.

In the absence of Drive signals DR, and assuming there is no external lock condition, the Conditioned Synchronized Drive signal CSDR applied to the gate 87 will remain at a low logic level. Therefore, regardless of the condition of the signal applied to its other input terminal, the output of the gate 87 will remain at a high logic level. The gate 109 will therefore be enabled to provide an inverted Timing signal T which is once again inverted at gate 119 and applied to a current drive circuit 121. The circuit 121 provides the Lock signal L in substantially concurrent timed relation with the Timing signal T whenever there are no Drive signals DR applied to the terminal 23.

When the Lock signal L goes high as shown in FIG. 6, either triac 57 or triac 71 will be enabled to pass current therethrough. At time T0 when the Lock signal L goes high the power signal applied to the motor coils is beginning a positive halfcycle. Therefore, the triac 57 will be enabled and current will flow through the diode 53, resistor 55 and triac 57 completing a circuit to the motor coils. The next positive going Lock signal pulse appears when the power signal is beginning a negative half cycle and therefore triac 71 will be enabled and current will flow through the diode 67, resistor 69 and triac 71. Diodes 53 and 67 thus act as a rectifying device operable to rectify the AC voltage applied to the field windings of the motor 11 thereby providing for the application of a DC voltage level to the field coils whenever the Locking signal L is generated. Thus, the Locking signal L effects the locking of the motor shaft in place thereby establishing the holding torque sufficient to overcome the force of the spring or biasing device 145 or 171 in FIGS. 4 and 5 and holding the regulated elemeent within the valve 5 at the position to which it was last moved.

However, upon the generation of a subsequent Drive pulse, and again assuming no external lock condition exists, the CSDR signal will go to a logic 1 level. Assuming that there has been no change in the direction signal, the output of the gate 87 will go to a logic 0 level thus disabling the gate 109 and holding the Lock signal L at a logic 0 level as shown at time T2 in FIG. 6. The Open signal O will go to a logic 1 level thereafter as shown in FIG. 6 thus enabling conduction through the triac 61. At that time the power signal is beginning a positive half-cycle and the triac 61 will begin conducting. When the power signal next crosses the zero axis, the Open signal again goes positive thereby enabling the maintenance of conduction through triac 61. That process as seen in FIG. 6 is repeated to allow the motor to rotate in response to three complete power signal cycles for example. Each cycle represents a step and therefore the motor is rotated three steps in response to the receipt of the three Drive signal pulses. Thereafter, the Drive signal DR will stay at a logic 0 level and the CSDR signal will again return to the logic 0 level thereby again effecting the enabling of the gate 109 and the resumption of the application of the Locking signal L to hold the motor shaft, and accordingly the regulated element within the valve 5, in place.

The embodiments of the present invention in which an exclusive property or privilege is claimed are defined as follows:

1. For use in controlling a regulated device, the combination comprising:
    power input terminal means arranged for connection to a source of AC power;
    motor means having field coils and a motor shaft;
    means arranged to provide a DC signal;
    switching means connected between said motor means and said power input terminals and to said DC signal means, said switching means being arranged for receiving a first direction control signal and a locking control signal, said switching means being responsive to said first direction control signal for completing a first circuit between said power input terminals and said motor means to apply the AC power to the motor means thereby effecting a rotation of the motor shaft in a first direction, said switching means being further responsive to said locking control signal to apply a DC signal to the motor terminals thereby effecting the locking of the motor shaft in situ in between applications of said first direction control signal, the motor shaft being thereby driven predetermined incremental amounts in accordance with the first direction control signal; and
    actuating means operatively coupled to said motor means and arranged for connection to the regulated device, said actuating means being responsive to the motor means for controlling the operation of the regulated device.

2. The combination as set forth in claim 1 wherein said motor means comprises a synchronous motor.

3. The combination as set forth in claim 1 wherein said switching means further includes means responsive to a second direction signal to effect rotation of the rotor shaft in a second direction.

4. The combination as set forth in claim 1 wherein said means for selectively providing DC power includes rectifying means, said switching means being operable to switch in said rectifying means in response to said locking control signal thereby rectifying the voltage applied to said motor means.

5. The combination as set forth in claim 1 wherein said actuating means includes:
    a ballscrew device;
    a first means for coupling the motor shaft to said ballscrew device; and
    second means arranged for coupling said ballscrew device to the regulated device, said regulated device being thereby operated in response to the rotation of said motor shaft.

6. The combination as set forth in claim 5 wherein said ballscrew device comprises a ballscrew and a ballscrew nut.

7. The combination as set forth in claim 6 wherein said motor shaft is coupled to said ballscrew, said regulated device being coupled to said ballscrew nut.

8. The combination as set forth in claim 6 wherein said motor shaft is coupled to said ballscrew nut, said regulated device being coupled to said ballscrew.

9. The combination as set forth in claim 1 wherein the regulated device is a valve operable between first and second limit stops, said actuating means including biasing means operable in the absence of motor torque to bias the regulated device to the first limit stop.

* * * * *